Figure 1:
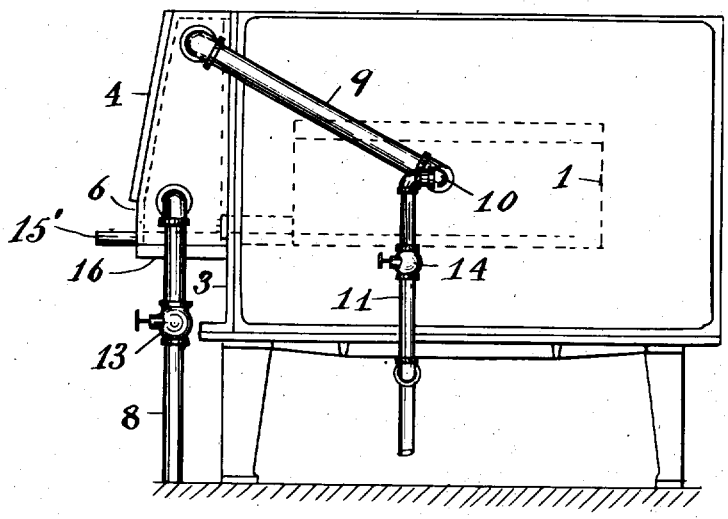

W. S. ROCKWELL.

PREHEATER AND FURNACE SHIELD.

APPLICATION FILED DEC. 3, 1913.

Reissued Apr. 14, 1914.

13,713.

3 SHEETS—SHEET 1.

Witnesses:
L. Lee.
J. Walter Neubour.

Inventor
Walter S. Rockwell, per
Thomas S. Crane, Atty.

W. S. ROCKWELL.

PREHEATER AND FURNACE SHIELD.

APPLICATION FILED DEC. 3, 1913.

Reissued Apr. 14, 1914.

13,713.

3 SHEETS—SHEET 2.

Witnesses:
L. Lee.
J. Walter Greenbowe.

Inventor:
Walter S. Rockwell, per
Thomas S. Crane, Atty.

W. S. ROCKWELL.

PREHEATER AND FURNACE SHIELD.

APPLICATION FILED DEC. 3, 1913.

Reissued Apr. 14, 1914.

13,713.

3 SHEETS—SHEET 3.

Witnesses:
L. Lee.
J. Walter Greenhowe.

Inventor
Walter S. Rockwell, per
Thomas S. Crane, Atty.

UNITED STATES PATENT OFFICE.

WALTER S. ROCKWELL, OF NEW YORK, N. Y., ASSIGNOR TO W. S. ROCKWELL COMPANY, OF NEW YORK, N. Y., A CORPORATION OF NEW JERSEY.

PREHEATER AND FURNACE-SHIELD.

13,713. Specification of Reissued Letters Patent. Reissued Apr. 14, 1914.

Original No. 1,079,266, dated November 18, 1913, Serial No. 784,912. Application for reissue filed December 3, 1913. Serial No. 804,511.

*To all whom it may concern:*

Be it known that I, WALTER S. ROCKWELL, a citizen of the United States, residing at 300 West One Hundred and Sixth street, New York, in the county of New York and State of New York, have invented certain new and useful Improvements in Preheaters and Furnace-Shields, fully described and represented in the following specification and the accompanying drawings, forming a part of the same.

The present invention relates to that class of furnaces used in heating metal for various purposes, as in forging, welding, bending, annealing, hardening, tempering, and other operations. Such furnaces have a heating chamber heated by suitable fuel, and provided with a so-called working-opening through which the metal to be heated is introduced and removed, and such working-opening is left open and used as the outlet for all or a part of the waste gases, when the metal is in bars which project through the opening during the heating operation, as in "making heats" upon the ends of rods for heading bolts, welding, &c. Such working-opening cannot be provided with a door where the bars project outwardly therefrom during the heating operation, and the flaming gases which escape at such opening necessarily create a very high temperature around the opening and cause great discomfort to the operator who handles the heated bars.

One object of the present invention is to utilize the waste heat of the escaping gases to heat the air which is used in the combustion of the fuel and thus heat the chamber with less consumption of fuel; and another object of the invention is to combine with the preheater for the air a shield to protect the operator in great part from the heat of the waste gases, where they escape from the working-opening.

To protect the operator, shields of various kinds have been employed adjacent to the working-opening to intercept the heat rays; but the present invention provides an attachment for the front of a heating furnace which not only intercepts the heat, but deflects the hot gases into direct contact with air-conduits which deliver the heated air to the fuel.

Where coal or coke is used as the fuel, the heated air is delivered thereto to promote the combustion; but where liquid or gaseous fuel is used, the heated air is discharged wholly or in part through the fuel-burners to mingle with the fuel as it enters the furnace-chamber.

Sometimes where short portions of bars are to be heated, it is common to locate such fuel-burners beneath the level of the bars; but where long bars are to be heated they require the support of the chamber-floor, and the burners are located above such floor; but the operation of the preheated air is the same in either case, to produce the required temperature with less consumption of fuel.

A typical form of the invention, for use adjacent to the working-opening of the furnace, consists of a shield which is combined with air-conduits in such a manner as to form a casing which is supported upon the furnace-front just above the furnace-opening and through which the waste-gases may be conducted.

The air is preferably conducted in a tortuous path through the preheater, to keep the air longer under the heating influence, and a series of transverse pipes is therefore employed which are connected at their opposite ends respectively by suitable headers.

Cast iron headers may be used, to the outer sides of which a shield can be attached which, with the headers, forms a complete inclosure or casing for the conduit-pipes, when fitted to the furnace-front.

A blast-pipe is preferably provided at the bottom of the casing, directing an air-current toward the escaping gases, to obstruct their flow toward the operator and compel them to move upwardly through the casing.

By attaching the headers to the furnace-front, the casing is wholly closed and operates to hold the waste-gases close to the surfaces of the conduits so as to heat the latter most effectively.

The series of pipes is somewhat inclined to the vertical so that the hot gas may strike all the transverse pipes successively as it rises to escape from the top of the casing.

The series of conduits is connected at one end to an air-supply-pipe, and at the other end to one or more delivery-pipes for conducting the heated air into contact with the burning fuel. With such construction, the lower horizontal pipe of the conduits is provided with perforations upon its lower side to discharge the air obliquely upon the current of gases escaping from the working-opening, and thus obstructing their outward movement and driving them upwardly into the casing.

The air-supply-pipe is provided with a cock or valve to regulate the blast, and the movement of air through the conduits, and the delivery to the fuel.

Where a furnace has working-openings at both ends, the combined shield and preheater may be applied to each of such openings, and the heated air from the two preheaters be delivered to the fuel.

It is evident that the construction of the different elements of this invention may be varied to suit furnaces of different kinds, one application of the invention being shown in the annexed drawing, in which—

Figure 2:
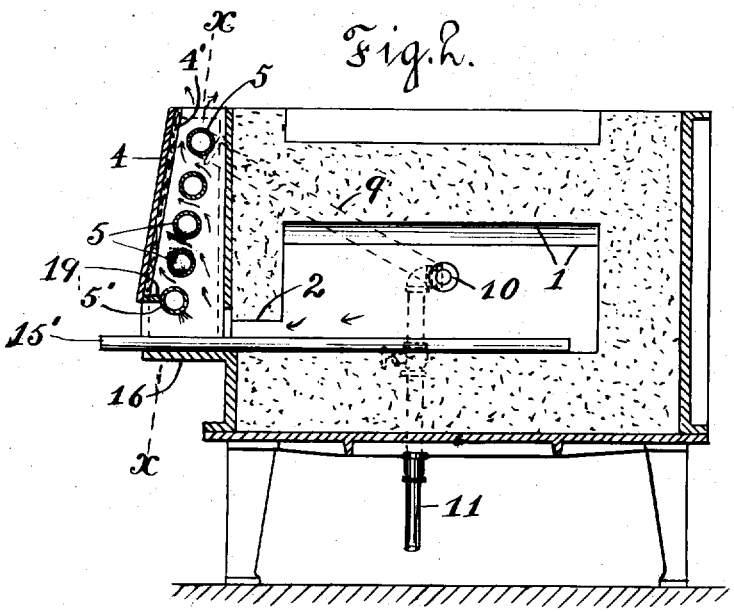
Figure 3:
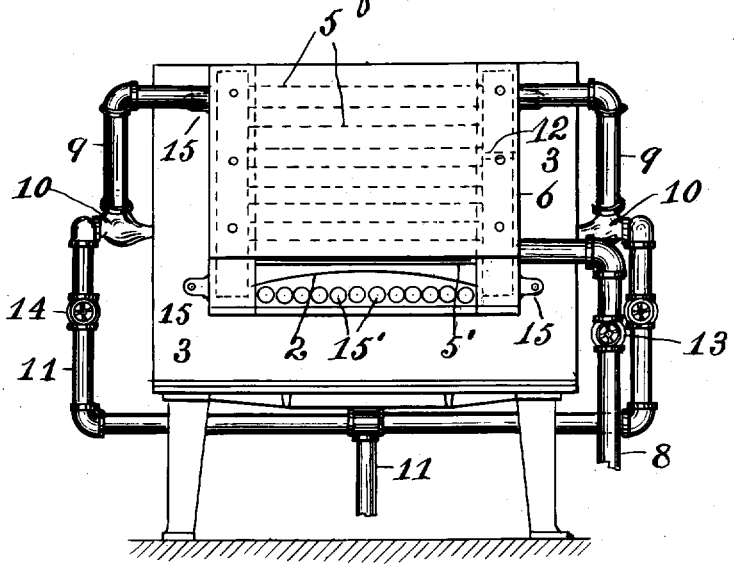
Figure 4:
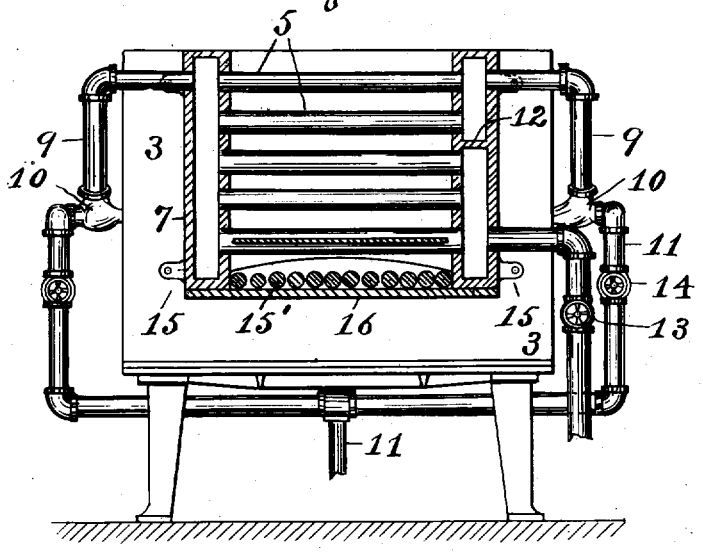
Figure 5:
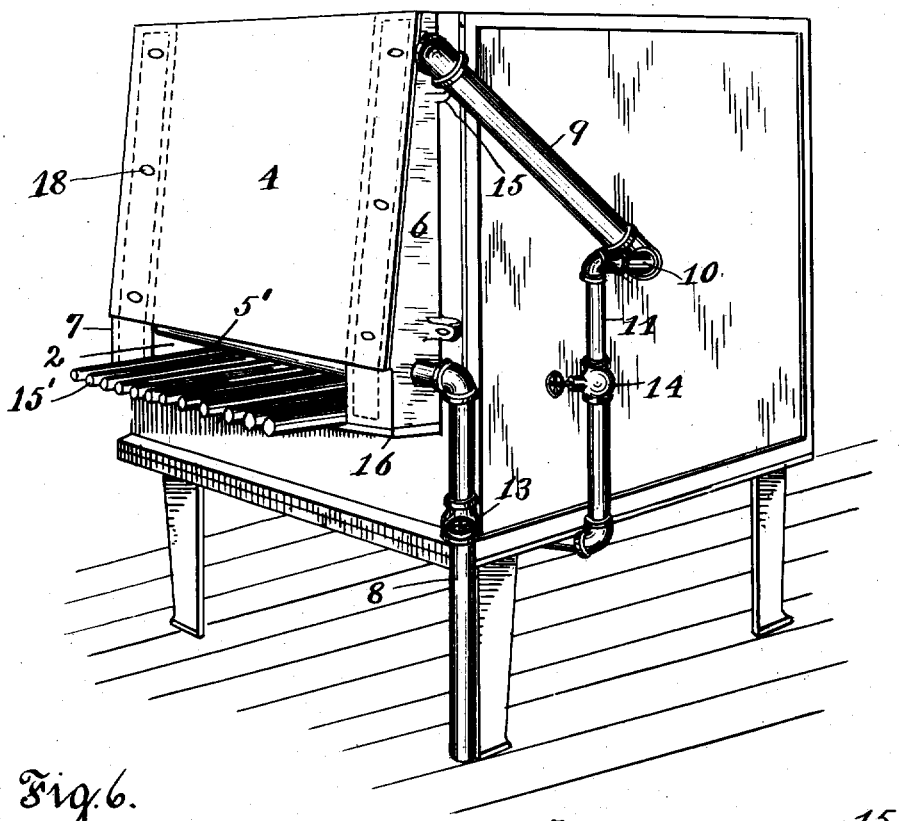

Figure 1 is a side elevation of a furnace with the attachment applied to its working-opening; Fig. 2 is a vertical section on the center line of Fig. 3; which is a front elevation of the furnace; and Fig. 4 is a vertical section on line *x—x* in Fig. 2. Fig. 5 is a perspective of the furnace, and Fig. 6 a plan of the combined preheater and shield.

The heating-chamber 1 is shown with a working-opening 2 in the form of a horizontal slot extending through the furnace-front 3, and permitting the escape of waste-gases in greater or less degree. Attached to the front 3, directly above the doorway 2, is the preheater casing, which is open at top and bottom, and has the shield 4 at its outer side. The casing contains a series of horizontal air-tubes 5, 5′, connected at their ends to headers 6, 7, which form the ends of the casing. One of the headers 6 is connected with the air-supply-pipe 8, and each is shown connected by a pipe 9 with a burner 10 having a gas or oil-supply-pipe 11. Each header has lugs 15 by which it may be bolted upon the furnace-front 3. The burners discharge into opposite sides of the heating-chamber 1, and no outlet for the waste-gases is shown except the working-opening 2.

The casing is attached to the furnace-front 3 and forms a gas-chamber into which the gases pass upwardly from the doorway, escaping into the atmosphere from the open top of the casing. The lowest pipe 5′ in the preheater is disposed just at the bottom of the casing near the top of the working-opening, and has a series of holes directed obliquely downward across the path of the escaping gases, so as to deflect the hot gas away from the operator. A group of rods 15′, projecting into the furnace to be heated, is shown resting upon a sill 16 which projects from the furnace-front 3 at the bottom of the working-opening 2, and the heated gases escape from the opening over the top of such rods, and would blow outwardly toward the operator if not deflected. The blast from the pipe 5′ is directed toward the sill, which renders it effective in arresting the gases as it prevents them from flowing outwardly, and when their outward movement is arrested, they naturally rise into the casing, and heat the air-tubes 5 and headers 6, 7, as desired. The series of air-tubes is somewhat inclined to the vertical to better intercept the hot rising gases.

A guard-plate or flange 19 is projected against the shield 4, from the outer side of the air-pipe 5′, to confine the gases within the casing, around the air-conduits, where their position disposes them to contact most effectively with the rising gases.

A baffle or partition 12 is inserted in the header 6, with which the air-supply-pipe 8 is connected, to prevent the passage of the air directly to the pipe 9 leading from such header, and the air is thus deflected reversely through the lower and upper tubes 5, and so absorbs more heat from the waste-gases. A cock 13 in the air-supply-pipe 8 regulates the supply of air to the blast-pipe 5′, the preheater pipes 5, and its delivery to the fuel.

The fluid fuel-pipes 11 are shown provided each with a valve 14, so that the heat in each side of the furnace-chamber can be regulated independently.

The shield 4 is covered with a layer 4′ of non-heat-conducting material like asbestos, so as to prevent the radiation of heat from the casing, thus protecting the operator efficiently, and at the same time applying the heat more effectively to the air passing through the preheater. The outer sides of the headers, as shown only in the plan in Fig. 6 may also be covered by asbestos facings 4ª, to prevent radiation of heat. With this construction, the workman is largely protected from the heat of the escaping gases, and the temperature of the heating-chamber is maintained with a diminished consumption of fuel.

Figure 6:
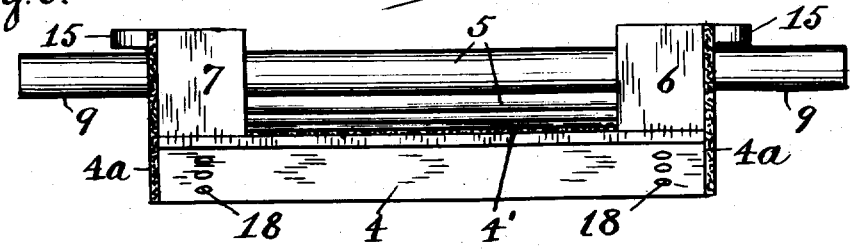

Fig. 6 is a plan of the attachment constructed as a new article of manufacture, and adapted for application to any furnace-front having a working-opening of length corresponding to the space between the air-conduit headers. This view shows screws 18 attaching the shield-plate 4 to the outer edges of the headers, and also shows the lugs 15 by which the attachment can be secured to a furnace-front. Fig. 6 also shows the air-delivery-pipes 9 projected from each of the headers to supply the hot air to fuel at both sides of the furnace.

As furnaces having a heating-chamber are constructed in a great variety of forms, it will be readily understood that the shape of the attachment may be varied to supply such furnaces with a combined shield and preheater of the character described herein; and the invention is not therefore limited to the precise construction shown in the drawing, but includes any such appliance providing a downward blast upon the escaping gases to arrest their outward movement; the combination of a preheater and inclosing casing with the wall of the furnace wherever the waste-gases escape, and the combination with a working-opening forming a gas-outlet, of a shield combined with a preheater to protect the operator from the waste-gases while utilizing their heat to heat the air for combustion.

Having thus set forth the nature of the invention what is claimed herein is:

1. An attachment for metal-heating furnaces, comprising a preheater and shield consisting of air-heating pipes with connections for the supply and delivery of air, a non-conducting plate at one side of such pipes and secured thereto, and means for supporting the preheater and shield upon the outside of the furnace.

2. An attachment for metal-heating furnaces, comprising a preheater and shield consisting of a plurality of pipes connected together at their ends and provided with inlet and outlet for air, a plate attached to such pipes and provided with a layer of non-conducting material to form a shield, and means for supporting the preheater and shield upon the outside of the furnace.

3. An attachment for metal-heating furnaces, comprising a preheater and shield consisting of a plurality of parallel pipes, headers connected respectively to the opposite ends of such pipes and provided with inlet and outlet for air, a plate attached to the headers and provided with a layer of non-conducting material to form a shield, and means for supporting the headers upon the outside of the furnace.

4. The combination, with a metal-heating furnace having a heating-chamber with an outlet for the waste-gases, of a casing of non-heat-conducting material supported adjacent to such outlet with the waste-gases conducted therethrough, and air-conduits in the casing in the path of the heated gases, and such conduits having inlet with connection to an air-blower, and to an outlet delivering the heated air to the fuel during the combustion of the same.

5. In a metal-heating furnace, the combination, with a furnace-front having a heating-chamber with working-opening in such front from which the waste-gases may escape, of a shield of non-heat-conducting material supported adjacent to the furnace-front above such working-opening, with a vertical passageway between such shield and front through which the waste-gases may travel, and an air-blast-pipe supported above the said opening at the bottom of the passageway, and directing an air-blast upon the gases escaping from the said opening and operating to deflect them into said passageway.

6. In a metal-heating furnace, the combination, with a furnace-front and a heating-chamber, with working-opening in such front from which the waste-gases may escape, of a shield of non-heat-conducting material supported adjacent to the front above said opening, forming a casing adjacent to such opening through which the waste-gases may travel, and connected air-conduits in such casing with outlet delivering the heated air to the fuel of the furnace, and with inlet connected to a pipe supplying air under pressure.

7. In a metal-heating furnace, the combination with a furnace-front and a heating-chamber, with working-opening in such front from which the waste-gases may escape, of a shield of non-heat-conducting material supported adjacent to the front above said opening, forming a casing adjacent to such opening through which the waste-gases may travel, connected air-conduits in such casing with outlet delivering the heated air to the fuel of the furnace, the bottom conduit being perforated and the air-blast therefrom directed against the waste-gases to deflect them from the operator into the said casing, an air-supply-pipe connected to the conduit, and a valve in such supply-pipe controlling the supply of air to the blast-pipe, the conduits, and the fuel.

8. In a metal-heating furnace, the combination, with a heating-chamber provided with fluid-fuel-burners and having a working-opening at the front permitting the escape of waste-gases therefrom, of a preheater casing above such opening, and air-conduits therein connected to the fuel-burners and supplying heated air thereto.

9. In a metal-heating furnace, the combination, with a heating-chamber provided with fluid-fuel-burners and having a working-opening at the front permitting the escape of waste-gases therefrom, of a preheater casing above such opening, with horizontal air-conduits arranged in an inclined series therein transverse to the movement of the gases, and supplying heated air to the fuel-burners.

10. In a metal-heating furnace, the combination, with a heating-chamber provided with fluid-fuel-burners and having a working-opening at the front permitting the escape of waste-gases therefrom, of a preheater casing above such opening with a non-heat-conducting shield upon its outer side, and air-conduits therein connected to the fuel-burners and supplying heated air thereto.

11. In a metal-heating furnace, the combination, with a heating-chamber provided with fluid-fuel-burners and having a working-opening at the front permitting the escape of waste-gases therefrom, of a preheater casing above such opening with a series of air-conduits 5, 5′ therein connected to an air-supply-pipe and to the fuel-burners, the lower pipe 5′ having perforations directed against the current of waste-gases to deflect them from the operator, and having a guard-plate 19 to throw the gases toward the inner sides of the air-conduits.

12. In a metal-heating furnace, the combination, with a furnace-front and a heating-chamber with working-opening in such front permitting the escape of waste-gases therefrom, of a preheater casing above such opening having free passage for the rise of the gases therein, a sill projected outwardly, and an air-blast-pipe supported upon the casing and directing a blast toward the said sill, to obstruct the forward movement of the gases and cause them to rise within the said casing.

13. The combination, with a heating-furnace having a heating-chamber with a normally open working-opening in the furnace-front through which the waste-gases may escape, of a shield extended upwardly above such working-opening outside of the furnace-front with space between such shield and front to permit the passage of hot-gases upwardly from the working-opening, a sill projected outwardly below the working-opening and an air-blast pipe supported near the top of such working-opening outside of the furnace-front and directing a blast obliquely upon the current of gases escaping from the working-opening to deflect them upwardly into the said space.

14. The combination, with a heating-furnace having a heating-chamber with a working-opening in the furnace-front from which the escaping gases may pass directly upward, of an air-conduit supported above such working-opening in such upward path of the gases and connected with an air-blower supplying air to the combustion-chamber of the furnace, a sill projected outwardly below the working-opening and an air-blast-pipe supported near the top of such working-opening and directing a blast obliquely upon the current of heated gases to deflect them upwardly into contact with the said conduit.

15. In a metal-heating furnace, the combination, with a heating-chamber provided with fluid-fuel-burners and having a working-opening at the front permitting the escape of waste-gases therefrom, of a preheater having a shield extended upwardly above such opening, with space to permit the passage of the gases, an air-conduit in such space, a sill projected outwardly below the working-opening, and an air-blast-pipe supported above the sill and directing a blast toward the said sill, to obstruct the forward movement of the gases, and divert them upwardly against the conduit.

16. The combination, with a heating-furnace having a heating-chamber with a working-opening in the furnace-front from which the escaping gases may pass directly upward, of an air-conduit supported adjacent to such outlet in the path of such gases and its ends connected respectively to an air-supply-pipe and to the combustion-chamber of the furnace.

17. The combination, with a heating-chamber having a working-opening in the furnace-front from which the escaping gases may pass directly upward, of a shield supported upon the furnace-front adjacent to such working-opening, and an air-conduit supported in the space between such shield and the furnace-front and its ends connected respectively with an air-supply-pipe and with the combustion-chamber of the furnace.

18. The combination, with a heating-chamber having a working-opening in the furnace-front from which waste-gases may escape, of a shield supported adjacent to the furnace-front, an air-conduit supported in the space between such shield and the furnace-wall, and an air-blast-pipe discharging an air-blast obliquely downward against the waste-gases to deflect them into the said space against the air-conduit.

In testimony whereof I have hereunto set my hand in the presence of two subscribing witnesses.

WALTER S. ROCKWELL.

Witnesses:
L. LEE,
THOMAS S. CRANE.